United States Patent [19]

Phillips et al.

[11] Patent Number: 4,723,305
[45] Date of Patent: Feb. 2, 1988

[54] DUAL BAND NOTCH ANTENNA FOR PORTABLE RADIOTELEPHONES

[75] Inventors: James P. Phillips, Lake in the Hills; Robert A. Gunther, Elmwood Park, both of Ill.

[73] Assignee: Motorola, Inc., Schaumburg, Ill.

[21] Appl. No.: 877,069

[22] Filed: Jun. 23, 1986

Related U.S. Application Data

[63] Continuation-in-part of Ser. No. 816,011, Jan. 3, 1986, Pat. No. 4,672,685.

[51] Int. Cl.⁴ .............................................. H04B 1/40
[52] U.S. Cl. ......................................... 455/89; 455/90; 379/58; 343/702
[58] Field of Search .................... 455/82, 83, 90, 89, 455/128, 129, 269, 351; 379/58; 343/702, 767, 872

[56] References Cited

U.S. PATENT DOCUMENTS

| | | |
|---|---|---|
| 3,573,628 | 4/1971 | Cramer et al. |
| 3,736,591 | 5/1973 | Rennels et al. ............ 343/702 |
| 4,003,060 | 1/1977 | Broce et al. ............ 343/113 |
| 4,313,119 | 1/1982 | Garay et al. ............ 343/702 |
| 4,410,890 | 10/1983 | Davis et al. ............ 343/419 |
| 4,571,595 | 2/1986 | Phillips et al. ............ 343/702 |
| 4,591,863 | 5/1986 | Patsiokas ............ 343/702 |

OTHER PUBLICATIONS

1978 Motorola Communications Buyer's Guide, p. 134.
Johnson, W. A., "The Notch Aerial in Some Applications to Aircraft Radio Installations", Proc. IEE, 102, Part B, 1955, pp. 211-218.
Rudge, A. W., et al. (Ed.), "The Handbook of Antenna Design", vol. 2, 1983, pp. 713-716, 743-748, 802-805, and 816-818.
Tanaka, et al., "Performance of Antenna Systems Having Cross Polarization in Mobile Communication", pp. 49-55, Institute of Applied Physics, University of Tsukuba, 1985.

*Primary Examiner*—Jin F. Ng
*Attorney, Agent, or Firm*—Douglas A. Boehm; Donald B. Southard; Charles L. Warren

[57] ABSTRACT

An improved antenna configuration is disclosed for a fully duplex portable radiotelephone that is normally operated in the nearly horizontal position next to the user's ear and mouth. A notch antenna is provided in the bottom portion of the portable radio transceiver parallel to the major longitudinal axis of the housing. The notch aperture is cut in the conductive radio housing at a transverse angle to the major face plane of the radiotelephone to form a notch antenna which radiates predominately vertically polarized E-field waves when the transceiver is positioned such that the major longitudinal axis of the radio is approximately 30 degrees to the horizontal. The notch is an effective quarter-wavelength long and is dual-fed from a pair of coaxial cable transmission lines near the shorted end of the notch.

22 Claims, 11 Drawing Figures

DUAL BAND NOTCH ANTENNA FOR PORTABLE RADIOTELEPHONES

CROSS-REFERENCE TO RELATED APPLICATION

This application is a continuation-in-part of co-pending application Ser. No. 816,011, filed Jan. 3, 1986, now U.S. Pat. No. 4,672,685.

BACKGROUND OF THE INVENTION

This invention relates to relatively narrow band antennas used with hand-held communications equipment. The invention is more specifically directed to such antennas which are disposed within the housing of the hand-held communications equipment.

Portable two-way radios have utilized a variety of antennas. One of the more common antennas used for such applications is a monopole. The use of a telescoping monopole is convenient since it can be retracted when not in use.

Antennas which are located within the housing of the portable communications equipment (subsequently referred to as an internal antenna) are desirable from the user's perspective. It eliminates a projecting external antenna which is subject to damage and may make a hand-held radio awkward to handle. Because of size limitations, internal antennas are often shorter than external antennas for the same frequency and have a narrower bandwidth.

When a conventional single input internal antenna is required to operate at two widely-separated frequencies such as for separate transmit and receive frequencies, a matching circuit has been used in order to provide a reasonable impedance match at both frequencies. For example, U.S. Pat. No. 4,571,595, entitled DUAL BAND TRANSCEIVER ANTENNA (corresponding to Ser. No. 558,270) provides a matching circuit in order to cover two separated frequency bands.

A conventional two-way radio having separate transmit and receive frequencies utilizes a duplexer circuit which serves to simultaneously couple the transmitter output and the receiver input to a common antenna. The duplexer serves to isolate the transmitter and receiver from each other.

Portable radios typically have antennas which are polarized along the long axis of the radio housing. These antennas provide optimum performance when the unit is held in the upright (vertical) position, such as when the user is holding the radio in front of his face and speaking into the microphone. However, fully duplex radiotelephones are not normally held in this optimum vertical position. Radiotelephones, like any telephone, are typically held in a nearly-horizontal position between the user's ear and mouth. This "telephone operating position" (i.e. tipped back 45 to 90 degrees to the vertical—typically 60 degrees) significantly degrades the portable radio antenna performance.

A need, therefore, exists for a portable radiotelephone antenna which provides improved performance when the radiotelephone is held next to the user's ear at an angle of approximately 30 degrees to the horizontal.

SUMMARY OF THE INVENTION

It is a primary object of the present invention to provide improved internal antenna configurations for portable two-way radios.

It is another object of the present invention to provide an improved antenna configuration for a fully duplex portable radiotelephone which is normally operated in the nearly-horizontal position next to the user's ear and mouth.

A further object of the present invention is to provide an internal antenna capable of operating in two separated frequency bands and providing a matched input for the transmitter at one frequency band and a separate matched input for the receiver at a different frequency band.

A first embodiment of the invention includes two spaced apart radiating elements connected to each other by a transmission line of approximately one half wavelength. One end of each radiating element is connected by this transmission line. The other end of the first radiating element is coupled by a first transmission line to a bandpass filter which is coupled to the receiver. The other end of the second radiating element is coupled by a second transmission line to a bandpass filter which is connected to the transmitter. The receiver bandpass filter presents a large reactance to the first transmission line at the transmit frequencies and the transmit bandpass filter presents a large reactance to the second transmission line for the received frequency range. The length of the first transmission line is selected to reflect an impedance such that the second transmission line provides a reasonable match to the output of the transmitter bandpass filter in the transmit frequency range. Similarly, the length of the second transmission line is selected to reflect an impedance which cause the first transmission line coupled to the bandpass filter of the receiver to present a reasonable match to the receiver bandpass filter over the receiver rang of frequencies. Thus, separate matched transmit and receive frequency inputs are provided by the antenna according to the present invention.

In a second embodiment of the invention, a notch antenna is provided in the bottom portion of the portable radio transceiver parallel to the major longitudinal axis of the housing. The notch aperture is cut in the conductive radio housing at a transverse angle to the major face plane of the radiotelephone to form a notch antenna which radiates predominately vertically polarized E-field waves when the transceiver is positioned such that the major longitudinal axis of the radio is approximately 30 degrees to the horizontal. The notch is an effective quarter-wavelength long and is dual-fed from a pair of coaxial cable transmission lines near the shorted end of the notch, utilizing the matching techniques of the first embodiment of the invention.

DEATILED DESCRIPTION

Figure 1:
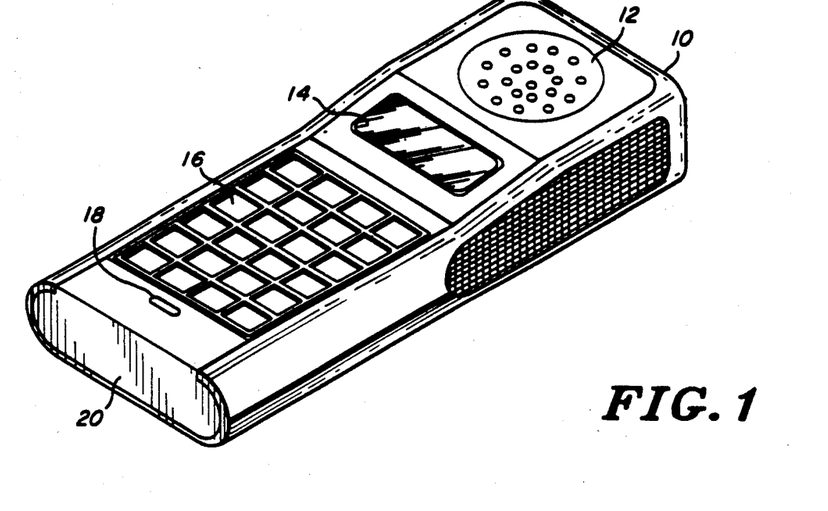
FIG. 1 is a perspective view of a hand-held two-way radio which utilizes an antenna according to the present invention.

FIG. 1 illustrates a hand-held two-way radio 10 having a speaker 12, a visual display 14, an input keypad 16, and a microphone port 18. An internal antenna according to the present invention is located in the bottom portion 20 of radio 10. Since an internal antenna is used, it will be apparent that the portion of the housing of radio 10 in the vicinity of the antenna should be made of a material which does not substantially interfere with the ability of the antenna to radiate and receive radio frequency energy. (See discussion of FIG. 5 for the second embodiment of the invention.)

Figure 2:
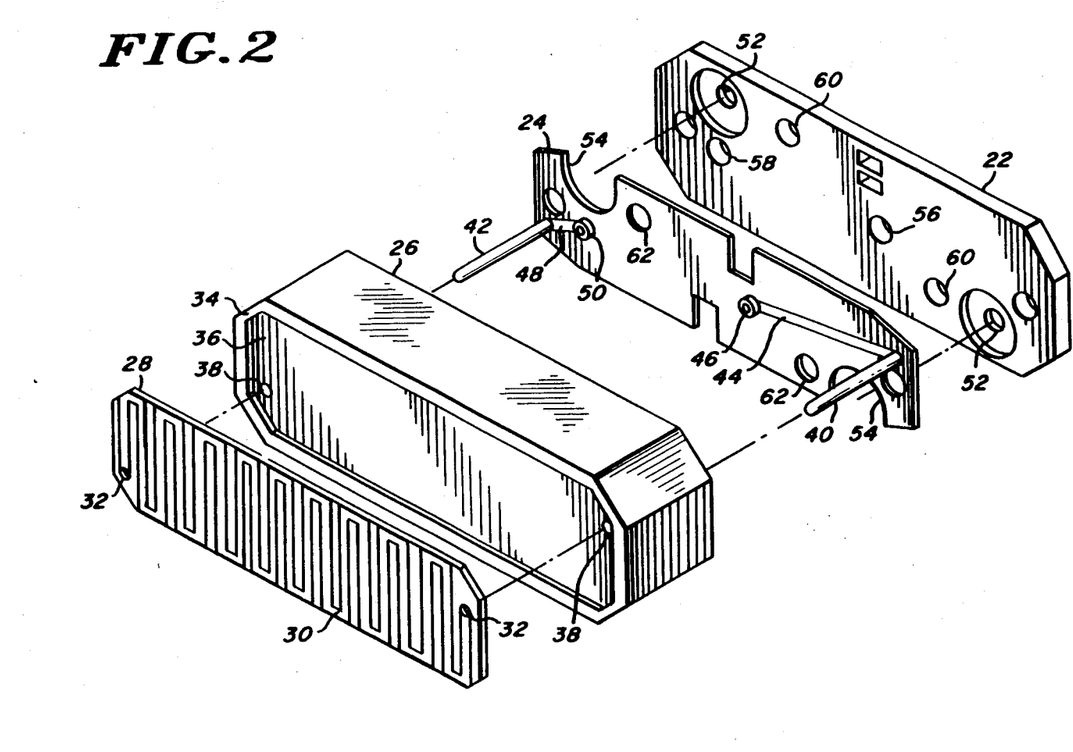
FIG. 2 illustrates an exploded view of the dual-element antenna according to the first embodiment of the present invention.

FIG. 2 illustrates an embodiment of an antenna according to the present invention which is located at the bottom 20 of radio 10. The major elements shown in FIG. 2 include a metal mounting plate 22, printed circuit board 24, a plastic spacer 26 and printed circuit board 28.

A serpentine copper pattern 30 extends between holes 32 in printed circuit board 28. The printed circuit board is dimensioned to fit within the peripheral lip 34 on spacer 26 against surface 36. Holes 38 extend through spacer 26 and are in alignment with holes 32.

Metal rods 40 and 42 which comprise the radiating elements of the antenna are mounted to board 24 and are aligned to project through holes 38 and 32. The distal ends of rods 40 and 42 are soldered to the respective ends of the serpentine pattern 30 on board 28. The attached end (base) of rod 40 is connected to a receptacle 46 by a conductor 44 on the surface of board 24. Similarly, the attached end of rod 42 is connected to receptacle 50 by a conductor 48. Holes in the board 24 aligned with receptacles 46 and 50 permit connections to be made with each from the side of the board not seen in FIG. 2.

Metal plate 22 has two holes 52 which are countersunk. These holes permit the plate 22 to be secured to the chassis of radio 10 by screws. Cutout portions 54 in board 24 align with the countersunk area surrounding holes 52 to provide clearance for mounting screws. Holes 56 and 58 in plate 22 are aligned respectively with receptacles 46 and 50. These holes provide clearance permitting projecting pins from radio 10 to engage receptacles 46 and 50. Tapped holes 60 in plate 22 are aligned with holes 62 in board 24 and enable the board to be mounted to the plate by means of screws.

The elements as seen in FIG. 2 interact to provide the following functions. Plate 22 serves as a ground plane. Conductors 44 and 48 in combination with the ground plane form transmission lines which connect rods 40 and 42 to receptacles 46 and 50. The rods 40 and 42 form the radiating portions of the antenna structure. The serpentine pattern 30 on printed circuit board 28 cooperates with the ground plane to form a transmission line which connects the radiating elements 40 and 42.

Figure 3:
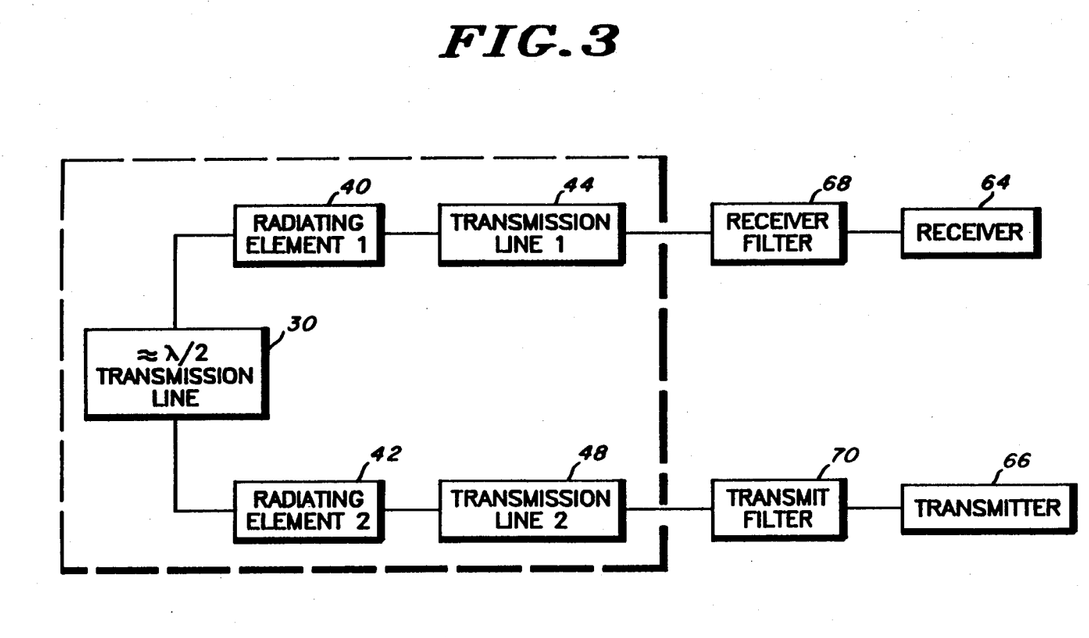
FIG. 3 is a block diagram illustrating the antenna of FIG. 2 as coupled to a two-way radio.

In the diagram of FIG. 3 the box formed by dashed lines represents the antenna elements as seen in FIG. 2. Separate antenna inputs are provided by transmission lines 44 and 48. A receiver 64 is connected through a bandpass receive filter 68 to transmission line 44. The transmitter 66 is connected through bandpass filter 70 to transmission line 48. The transmission lines 44 and 48 are connected respectively to the radiating elements 40 and 42 which are in turn connected together by the approximate one-half wavelength transmission line 30. The receiver, transmitter, and the respective filters are conventional.

Normally the receiver input and the transmitter output are designed for a given impedance, such as the commonly used 50 ohm impedance. The receiver receives a signal in one frequency range while the transmitter transmits a signal in another separated frequency range. The receive filter 68 presents a nominal 50 ohm impedance over the receive frequency range and presents a high reactance to frequencies in the transmit range. Similarly, the transmitter filter 70 presents a nominal 50 ohm impedance over the transmit frequency range but presents a large reactance to frequencies in the receive frequency range. The antenna according to this invention utilizes the reactance of the receive and transmit filters with respect to out of band frequencies to achieve a 50 ohm match at each input. This aspect will be explained more fully below.

The center design frequency is the geometric mean frequency of the lowest and highest frequencies. In a particular embodiment of the present invention, radiating element 40 and 42 are identical and selected to be 1/15th wavelength long at the center design frequency. However radiating elements greater than 1/20 wavelength and up to ¼ wavelength could be used. Transmission lines 44 and 48 have the same characteristic impedance, 50 ohms, as the nominal impedance of the receive and transmit filter 68 and 70, respectively. Since transmission line 30 is spaced a substantial distance with respect to ground plane 22, the characteristic impedance of transmission line 30 is substantially higher than that for transmission lines 44, 48. In the specific embodiment of the antenna, the characteristic impedance of transmission line 30 is approximately 900 ohms.

The following method can be utilized to adjust the present antenna so that its input connected to receive filter 68 provides a 50 ohm match at the receive frequencies and the input to the transmit filter 70 provides a 50 ohm match for the transmit frequency range. In this example, the radiating elements 40 and 42 are selected to be substantially identical. It has been determined that radiating elements of approximately 1/15th wavelength represent a good compromise between radiation efficiency and physical size. It will be understood of course that other lengths of radiating elements could be utilized. Elements greater than 1/20th wavelength but less than ¼ wavelength are preferred. The length of transmission line 30 is determined by providing a short circuit directly at the base of radiating element 40 and adjusting the length of the transmission line so that the impedance measured directly at the base of radiating element 42 is 50 ohms at the center design frequency.

The short circuit at the base of radiating element 40 is removed and the length of transmission line 44 is adjusted so that the impedance directly at the base of radiating element 42 is 50 ohms at the center frequency within the transmit frequency range. In the transmit frequency range the receive filter 68 presents a substantial reactance that is transformed by transmission line 44 into an appropriate reactance which is reflected through radiating element 40 and transmission line 30 to radiating element 42. The impedance coupled to radiating element 42 combines with its impedance to provide a 50 ohm termination.

A similar procedure is utilized to determine the length of transmission line 48 needed to provide a match for the receiver frequencies. Since transmission line 44 has a 50 ohm characteristic impedance, a means for measuring impedance may be utilized at the output of this transmission line rather than directly at the base of radiating element 40. With the transmit filter 70 coupled to transmitter 66 and to transmission line 48, the length of the transmission line 48 is adjusted until a 50 ohm termination is provided at the output of transmission line 44 at the center frequency in the receive frequency range. The transmit filter 70 provides a substantial reactance at the center receive frequency which is transformed by transmission line 48 and coupled through radiating element 42 and transmission line 30 to radiating element 40. The impedance coupled to radiating element 40 combined with its impedance results in a 50 ohm termination to the receive filter 68. It will be understood that because both transmission lines 44 and 48 have a characteristic 50 ohm impedance, the insertion of these transmission lines between the respective radiating elements and filters maintains the desired matching impedance.

A particular application of the present invention is disclosed in order to provide a specific example to assist in understanding the present invention. In the particular application, the transmit frequency range is 825–845 MHz, and the the receive frequency range is 870–890 MHz. These frequency ranges result in a geometric mean (center frequency) of 856.884 MHz. Each radiating element is 0.5 inches (1.27 cm) in height and 0.05 inches (0.127 cm) in diameter. The impedance of each radiating element at the center frequency is approximately 6 ohms resistive and 40 ohms reactive (inductive). The impedance of the radiating element is influenced by several factors including uniform current distribution along the element, the relatively small ground plane provided by plate 22, and the effect of a user's hand which is normally positioned on the radio near one of the radiating elements. Transmission line 30 has a characteristic impedance of approximately 900 ohms and when adjusted in accordance with the previously described method is 0.486 wavelengths at the center frequency. Although the particular example uses a transmission line 30 of approximately ½ wavelength, a wavelength of N/2 could be used where N is a positive integer greater than zero. The receive filter 68 is a six pole comb line ceramic type filter having a 50 ohm impedance in the receive frequency range. The transmit filter 70 is a five pole comb line ceramic type filter having an impedance of 50 ohms in the transmit frequency range. Transmission lines 44 and 48 each have a characteristic impedance of 50 ohms.

In order to match the transmit antenna input to 50 ohms, the length of transmission line 44 was adjusted to be 0.227 wavelengths in order to transform the high reactance presented by receive filter 68 at the transmit frequencies to a value that results in a 50 ohm impedance at the base of radiating element 42. An inductive reactance of approximately 60 ohms at the base of radiating element 40 results in the desired match at the transmit antenna input.

The length of transmission line 48 was adjusted to 0.532 wavelengths in order to transform the high reactance presented by the transmit filter 70 at the receive frequencies so that a 50 ohm match at the base of radiating element 40 results. A capacitive reactance of approximately 80 ohms at the base of radiating element 42 results in the desired match at the receive antenna input. Transmission lines 44 and 48 could also be extended by adding one half wavelength sections of transmission line which would maintain the same impedance.

Figure 4:
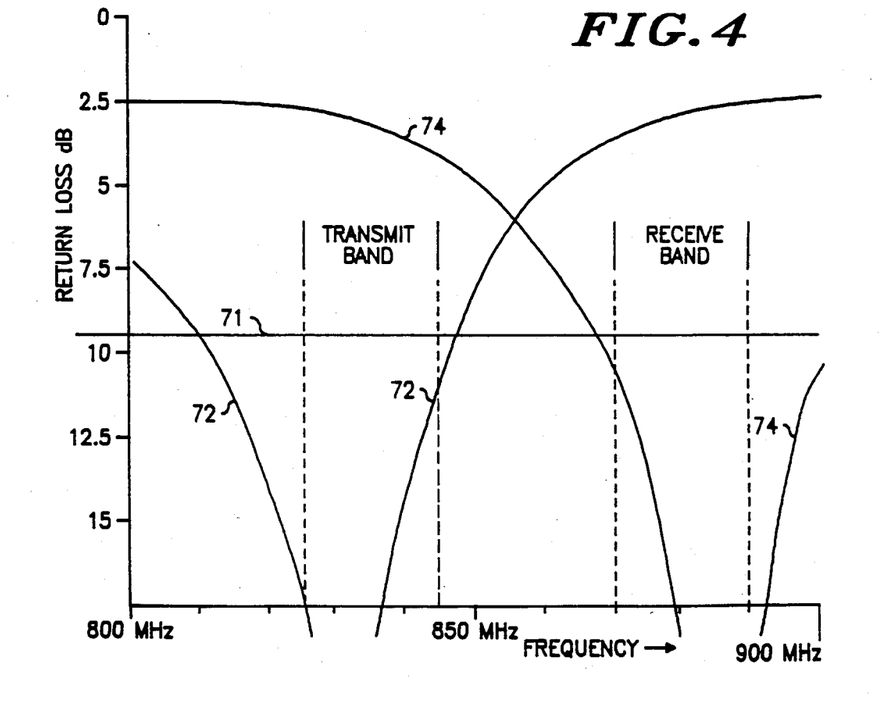
FIG. 4 is a graph of return loss versus frequency for each antenna input.

FIG. 4 illustrates two graphs in which the return loss in decibels is plotted versus frequency. The response of the transmit and receive inputs ar indicated on the graph. A horizontal line 71 representing a standing wave ratio (SWR) of 2:1 is shown. The area below line 71 represents a SWR of less than 2:1. Graph line 72 illustrates return loss versus frequency for the transmit antenna input and graph line 74 illustrates return loss versus frequency for the antenna receive input. It will be noted by referring to the graphs that both the transmit and receive antenna inputs have return losses which correspond to a standing wave ratio of less than 2:1.

The present invention provides a receiver input coupled to a receiver filter which is matched to the characteristic impedance of the filter in the receive frequency range and a transmitter input coupled to a transmitter filter which is matched to the characteristic impedance of the filter in the transmit frequency range. The reactance presented by each filter for frequencies outside its passband is utilized to achieve the desired impedance for the antenna inputs.

Because the present antenna provides separate matched receive and transmit inputs, additional circuitry such as a duplexer or matching circuits is not needed in order to utilize the antenna for receiving an transmitting at separated frequencies. This antenna permits dual band operation of what is essentially a narrow band antenna.

Figure 5:
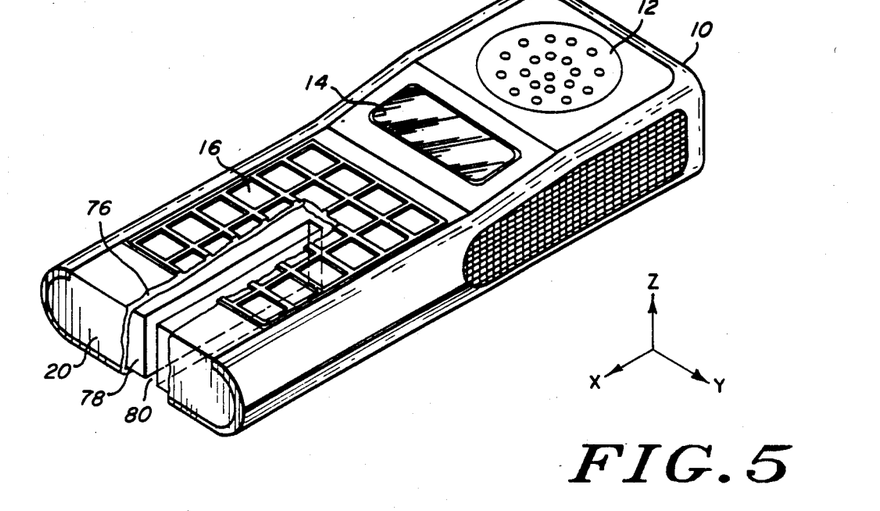
FIG. 5 is a perspective view of the hand-held two-way radio of FIG. 1 shown partially cut away to illustrate the location of the notch antenna in accordance with the second embodiment of the present invention.

FIG. 5 illustrates the hand-held two-way radio 10 of FIG. 1, having internal notch antenna 80 located in the bottom portion 20 of radio 10. In this embodiment, the radio housing is comprised of an inner metallic shell 78 (conductive) covered by a outer plastic case 76 (nonconductive). Thus, in accordance with known antenna theory, notch 80 forms an open-ended slot antenna (the complement of a metallic dipole antenna) wherein the metallic shell 78 acts as a semi-infinite conductive plane (the counterpart of free space for a dipole antenna). Metallic shell 78 encloses the internal circuitry components of the radio, such as the receiver and transmitter circuitry. Although the internal circuitry contained within metal shell 78 must be appropriately designed to leave room for notch 80, the actual length of radio 10 can be made shorter since the bottom portion 20 need not be reserved solely for antenna components. This can be a significant advantage in portable radiotelephone applications, since there is a growing trend toward designing smaller hand-held radios.

Figure 6:
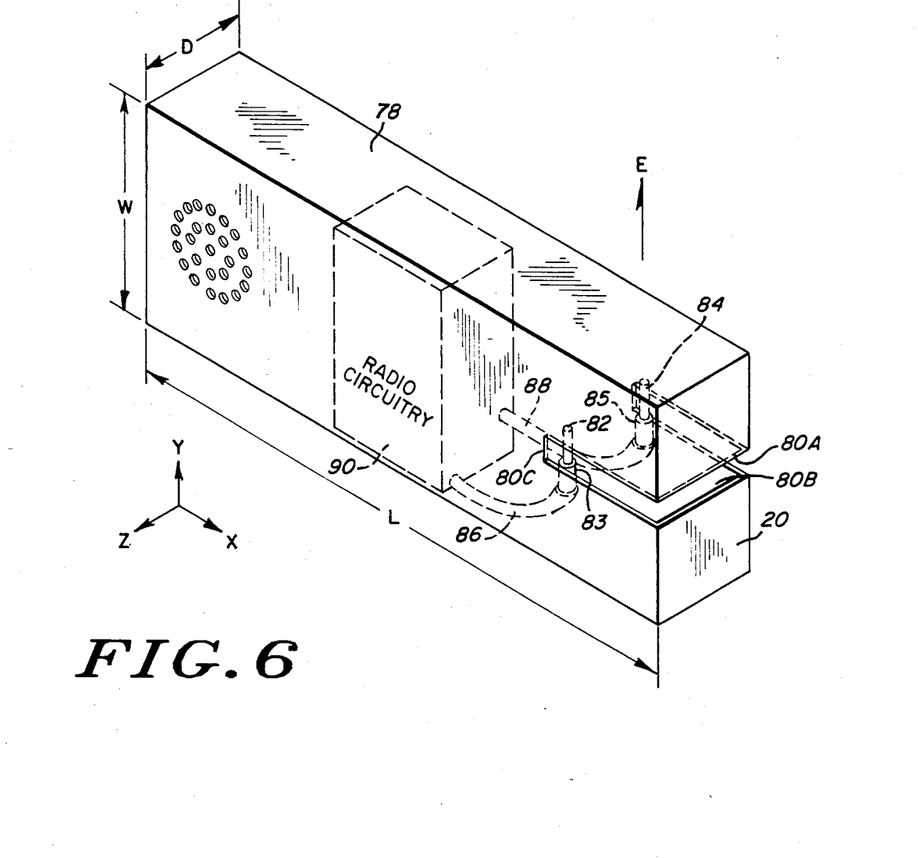
FIG. 6 is a more detailed perspective view of the notch antenna of FIG. 5 illustrating the dual-feed transmission line coupling aspect of the invention.

FIG. 6 illustrates notch antenna 80 in more detail. In the preferred embodiment, metal housing 78 is shaped in the form of a rectangular box having a length L along the X axis, a width W along the Y axis, and a depth D along the Z axis. Notch 80 is positioned in the bottom portion 20 of conductive housing 78 such that a plane passing through the notch is perpendicular to the major surface plane of the housing (which is parallel to the X-Y plane). Notch 80 is cut in the bottom of the case such that the antenna is located away from the operator's hand and head. The notch is centered along the major longitudinal axis of the housing (parallel to the X axis) for radiation pattern symmetry to accommodate left-handed or right-handed users.

In the preferred embodiment, notch 80 is an effective quarter-wavelength long and is fed from two coaxial cables 86, 88 near the shorted end 80c of the notch. The inner conductors 82, 84 of each cable 86, 88 are soldered or otherwise electrically attached to two feed points located on the notch upper surface 80a. The outer conductors or shields 83, 85 of each coaxial cable 86, 88 are soldered or otherwise attached to the lower surface of the notch 80b. The other end of coaxial cables 86, 88 are attached to radio circuitry 90 as shown. The electrical parameters of the notch antenna will be described later.

When an RF signal, provided by radio circuitry 90, is applied through coaxial cables 86, 88 to notch antenna 80, the open end of the notch will exhibit different electrical potentials such that an E-field is generated across them in the Y direction. The E-field is radiated omnidirectionally from the feed point of the notch antenna predominately in the X-Z plane with vertical polarization with respect to the X-Z plane. In other words, the E-field vector is parallel to the Y axis as illustrated in FIG. 6. The antenna radiation characteristics (in three dimensions) exhibit a torroidal shape centered around the Y axis with the nulls (no response) located on the Y axis and uniform maximum response in the X-Z plane. Hence, the E-field radiation vector is polarized transversely to the major longitudinal axis (X axis) of the radio and perpendicular to the major surface plane (X-Y plane) of the radio.

The normal operating position for a duplex radiotelephone is where the radio speaker (12 of FIG. 1) is held next to the user's ear and where the microphone port (18 of FIG. 1) is located next to the user's mouth. This angled "telephone operating position" touching the user's ear is necessary to prevent acoustic feedback in a fully duplex system, whereas the front-of-the-face position is sufficient for simplex portable two-way radios.

Since the user's head is typically upright when operating the radiotelephone, the major longitudinal axi of the portable radiotelephone held in the operating position will not be vertical. Instead, the positioning angle will be a function of the angle from the user's ear to the user's mouth, and the position of the user's head with respect to the horizontal. Generally, the longitudinal axis of the radiotelephone is approximately 30 degrees to the horizontal when the radio is held in the operating position and the user's head is held upright. This angle will vary depending on the user head and hand position. However, the angle normally ranges from 0 to 45 degrees from the horizontal. As will be shown later, this position causes the signal radiated from the notch antenna to be predominately vertically polarized such that it is co-polarized with a vertical base station antenna. This provides the maximum signal strength, and thus, the maximum range. (The radiation patterns will be described later.)

Since all small antennas are inherently narrow banded, special techniques are necessary to allow operation over a wider frequency range. In the case of 800 MHz fully duplex, cellular radiotelephone systems, the dual-feed aspect of the present invention previously described provides the necessary wide-banding of the notch antenna.

Figure 7:
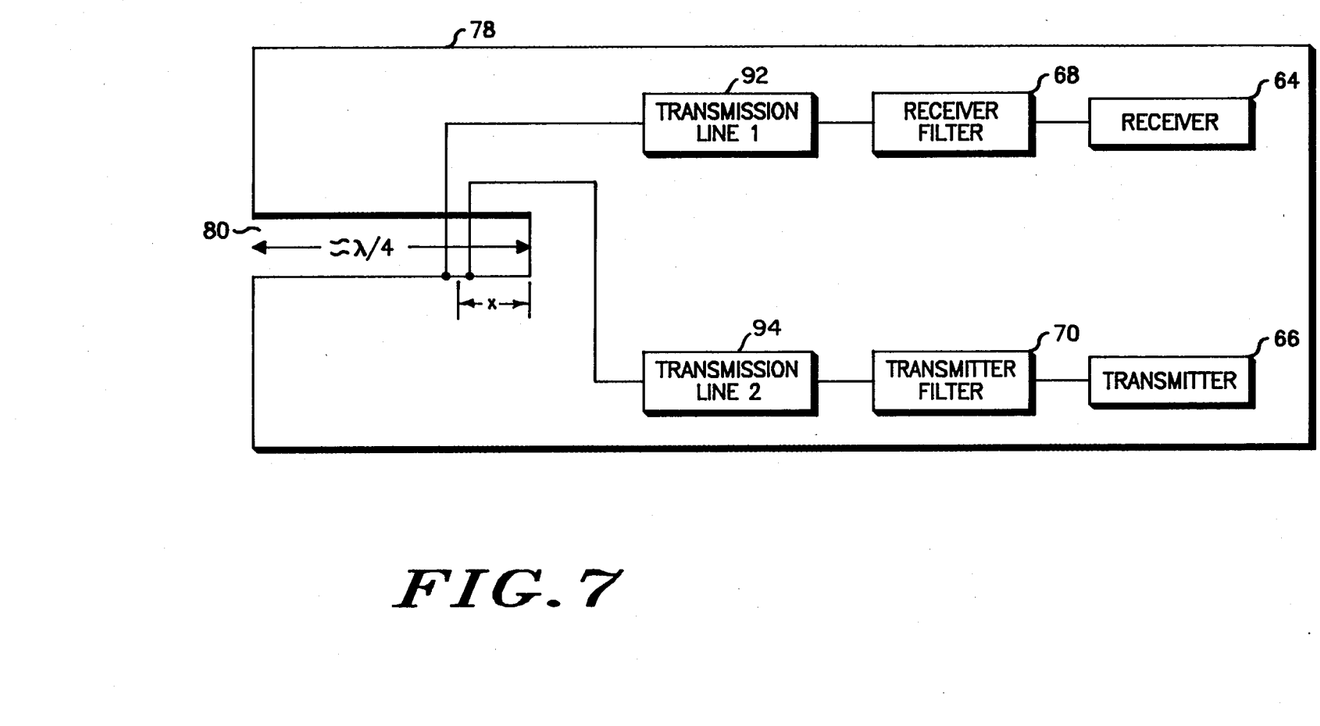
FIG. 7 is a block diagram of the radiotelephone of FIG. 5 illustrating how the notch antenna is coupled to the radio transmitter and receiver.

In the block diagram of FIG. 7, the inner metallic shell 78 of the radio is illustrated containing the radio components. Notch antenna 80 is formed within metallic shell 78 as shown. Receiver 64, transmitter 66, receiver filter 68, and transmitter filter 70 are operationally and structurally the same as the corresponding components of FIG. 3. Transmission lines 92 and 94 are represented in the preferred embodiment of FIG. 6 by coaxial cables 86 and 88. The transmission lines serve to couple receiver filter 68 and transmitter filter 70 to the respective antenna inputs such that both the transmitter and receiver are matched within each of their respective frequency bands and such that the transmitter and receiver are isolated from each other.

The following procedure is utilized to adjust the dual-band notch antenna to frequency. First, the dimensions of the notch antenna itself are determined. Notch antenna 80 is selected to be a particular fraction of a wavelength long at the center design frequency (geometric mean of the lowest and highest antenna frequencies). In the preferred embodiment, the notch antenna is designed to be ¼th wavelength long with a dielectric material filling notch 80. However, notch antenna lengths greater than 1/10th wavelength and less than ¾th wavelength could also be used.

Dielectric material, such as polyethylene, alumina, or polypropylene oxide, may be placed in the notch to allow the notch antenna length (in the X direction) to be reduced by a factor of $1/\sqrt{E_r}$, where $E_r$ is the dielectric constant ranging from 2 to 25. The dielectric will also reduce the width of the notch (in the Y direction) by the sam factor. In the preferred embodiment, polyethylene, having a dielectric constant of 2.26, is used.

The width of the notch (in the Y direction) determines the operational frequency bandwidth of the antenna. The bandwidth increases as the width of the notch increases. Therefore, to optimize the internal space reserved for circuitry, the notch width is selected to be the minimum dimension which will allow the antenna to operate over a frequency range equal to the wider of either the transmit or receive frequency band.

Next, the coaxial cable connections are determined. The distance "x" in FIG. 7 (in the X direction) from each coaxial feed point to the end of the notch 80c is determined by the characteristic impedance of the transmission line (coaxial cable). This distance x is chosen to obtain the optimum match between the real part of the notch antenna impedance and the characteristic impedance of the transmission line 92 at the resonant frequency. As the distance x is decreased, the real part of the antenna impedance is decreased (and vice versa). For coaxial cable having a characteristic impedance of 50 ohms, the distance x is 0.037 wavelength, which is 0.312 inches at 856.884 MHz.

The distance in the Z direction between each coaxial feed point in the dual-feed configuration affects the duplex isolation. Therefore, this distance is selected to be the maximum that is mechanically possible, and is limited by the depth of the portable radiotelephone.

Finally, the length of transmission lines 92 and 94 are found by determining the reactance required to independently adjust the operational frequency bands of the antenna from the geometric mean frequency of the combined transmit and receive bands to the center frequency of the transmit band, and to the center frequency of the receive band, respectively. This procedure is basically the same as that previously described in conjunction with the dual-element antenna embodiment of FIG. 3. Briefly, the length of transmission line 94 is adjusted at the center receive frequency to maximize the signal at the input to receiver 64. Similarly, the length of transmission line 92 is adjusted at the center transmit frequency to maximize the signal at the output of transmitter 66. The length of transmission lines 92 and 94 should be less than ¼ wavelength for maximum bandwidth over each respective frequency range. The reactance presented by receive filter 68 and transmit filter 70 for frequencies outside their passbands are utilized to achieve the desired impedance for the antenna inputs. Thus, the need for additional duplexer circuitry is obviated.

The notch antenna of FIG. 6 exhibits the same return loss versus frequency response as that of the dual-element antenna of FIG. 2. Hence, FIG. 4 also illustrates the response of the transmit and receive inputs of FIG. 7. Graph line 72 illustrates return loss versus frequency for the antenna transmit input an graph line 74 illustrates return loss versus frequency for the antenna receive input. Again it will be noted that both the transmit and receive antenna inputs have return losses which correspond to a standing wave ratio of less than 2:1.

The RF frequencies and antenna dimensions are given below with respect to FIG. 6 to provide a specific example of the second embodiment of the present invention. In this preferred embodiment, the transmit frequency range is 825–845 MHz, and the receive frequency range is 870–890 MHz. These frequency ranges result in a geometric mean (center frequency) of 856.884 MHz. Accordingly, ¼th wavelength with a dielectric of $E_r = 2.26$ is 2.15 inches (5.47 cm), which corresponds to the length of the notch antenna in the X direction. The width of the notch is 0.25 inches (0.635 cm) in the Y direction. The length L of metal housing 78 is 7.00 inches (17.78 cm), while the width W is 2.50 inches (6.35 cm) and the depth D is 0.75 inches (1.90 cm). The coaxial feed points are positioned at a distance of 0.312 inches (0.79 cm) from the shorted end 80c of the notch, and are positioned at 0.625 inches (1.59 cm) from each other. The length of coaxial cables 86 and 88 are 1.04 (2.66 cm) and 3.14 inches (7.98 cm), respectively, to serve as proper terminations for filters 68 and 70. These transmission line lengths then provide a 50 ohm impedance for receiver 64 and transmitter 66.

FIGS. 8 through 11 graphically illustrate the comparison between the two antenna embodiments of the present invention. Each graph represents a vertical polarization azimuth radiation pattern of the portable radio shown in FIGS. 1 and 5 being positioned such that the major longitudinal axis of the radio is 30 degrees from the horizontal. Each outer division of the graphs represent 1 dB, while each inner division represents 5 dB. Two graphs are provided for each antenna embodiment to demonstrate the effect of the user's hand and body on the radiation pattern. These graph dramatically illustrate the performance advantage of the notch antenna for a fully-duplex portable radiotelephone.

Figure 8:
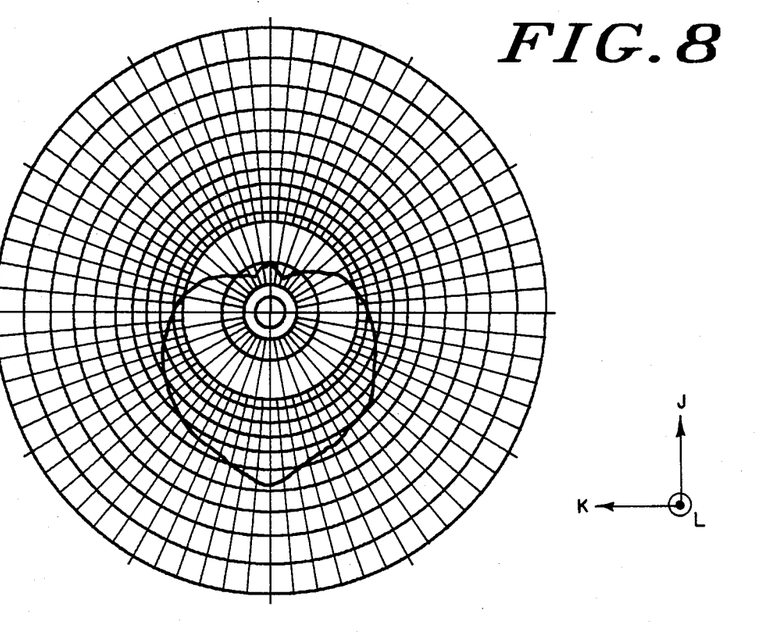
FIG. 8 is a graphical representation of the radiation pattern of the dual-element antenna of FIG. 2 when the radio is positioned such that its long axis is at a 30 degree angle to the horizontal in free space.

FIG. 8 shows the radiation pattern of the portable two-way radio of FIG. 1 having the dual-element antenna configuration of FIG. 2. The J-K plane of FIG. 8 represents the horizontal plane of the earth, and the L axis represents a vertical line perpendicular to the surface of the earth. The radio is oriented such that its major longitudinal axis (X axis of FIG. 6) lies in the J-L plane at a 30 degree angle to the horizontal (J-K plane) having the antenna located in the bottom portion of the radio. The radiotelephone is further positioned such that its major face (the X-Y plane of FIG. 6) is coincident with the J-L plane. In other words, the top of the radio is tipped in the negative J direction 60 degrees from the vertical L axis about the horizontal K axis. This orientation represents the normal operating position of a portable radiotelephone where the user would be facing in the positive J direction holding the radio in his right hand. Since both antennas are symmetrical with respect to the radio's major longitudinal axis, the radiation pattern would be the same for a right-handed or left-handed user. However, FIG. 8 illustrates the radiation pattern in free space—not hand-held.

As is evident from the graph of FIG. 8, the dual-element antenna exhibits less than optimum performance when held at a 30 degree angle to the horizontal—even in free space. This is to be expected since the antenna is co-polarized with a vertical base station antenna only in the approximately upright position. As the radio is tipped towards the horizontal, the E-field becomes cross-polarized, and the radiation pattern becomes less omnidirectional. This radiation performance is typical of most portable radio antennas which are vertically polarized along the major longitudinal axis of the radio.

Figure 9:
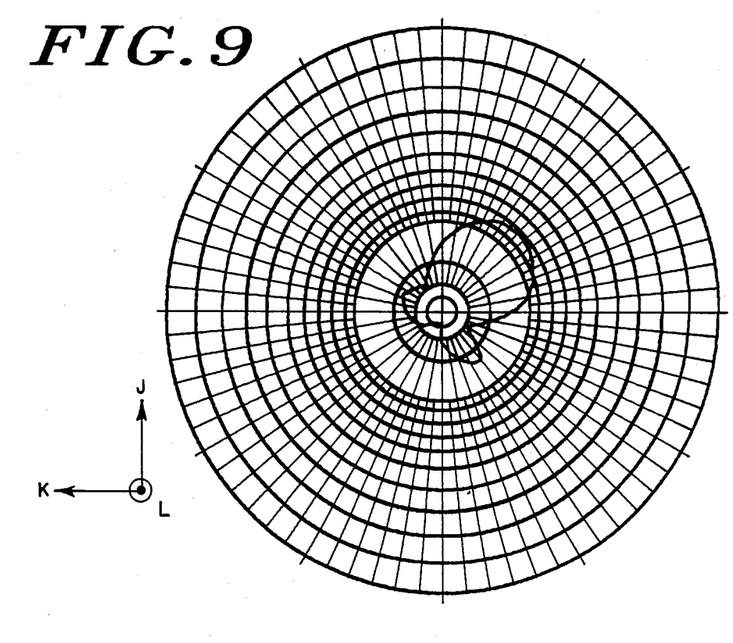
FIG. 9 is a graph of the radiation pattern of the dual-element antenna of FIG. 8 when the radio transceiver is hand-held at the same 30 degree angle from the horizontal.

FIG. 9 shows the human body effects on the radiation pattern when the radio of FIG. 8 is hand-held in the same orientation of that of FIG. 8. In FIG. 9, the user is holding the radiotelephone to his mouth and right ear in his right hand. (In other words, the graph illustrates the radiation pattern looking down on the top of the user's head while he is facing in the positive J direction.) As expected, there is a significant loss of antenna gain caused by the human body.

Figure 10:
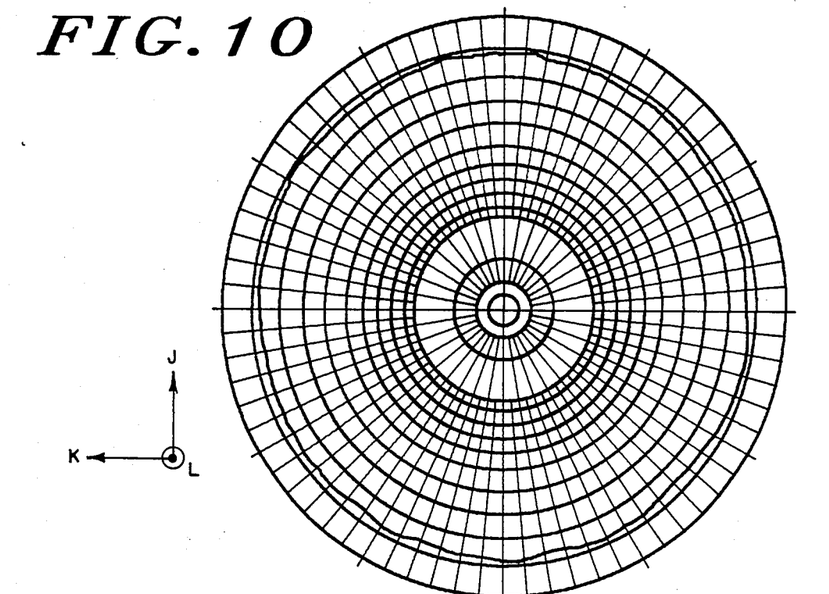
FIG. 10 is a graph of the radiation pattern of the notch antenna of FIG. 6 when the radio transceiver is positioned such that its long axis is at a 30 degree angle to the horizontal in free space.

FIG. 10 is the corresponding graph to FIG. 8 for the notch antenna. That is, FIG. 10 illustrates the free space vertical polarization azimuth radiation pattern of the radio of FIG. 5 having the notch antenna of FIG. 6. The radio is oriented in the same position as FIGS. 8 and 9, that is, wherein the major longitudinal axis of the radio lies in the J-L plane at a 30 degree angle to the horizontal J-K plane. The radiation pattern of FIG. 10 is substantially omnidirectional when the radio is in free space.

Figure 11:
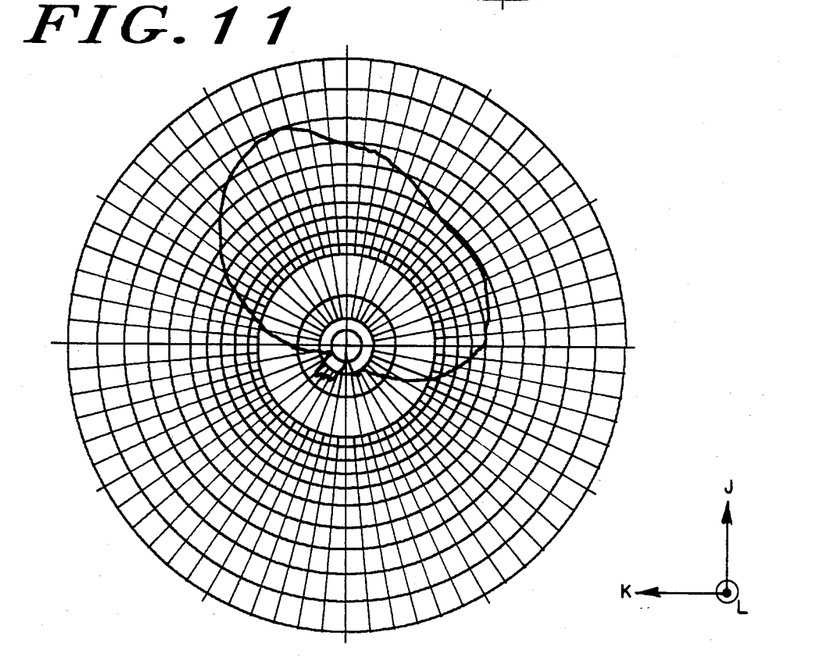
FIG. 11 is a radiation pattern of the notch antenna of FIG. 10 when the radio transceiver is hand-held next to the user's ear at the same 30 degree angle to the horizontal.

FIG. 11, the corresponding notch antenna radiation pattern to FIG. 9, represents the notch antenna being held in the normal operating position in user's right hand, the notch being located in the bottom of the radio. Again, the human body significantly blocks the radiation in the negative J direction. However, the graph of FIG. 11 clearly illustrates a significant improvement in antenna gain (−6.20 dBd average gain) over that of the dual-element antenna of FIG. 9 (−13.50 dBd average gain) when held in the normal radiotelephone operating position. Accordingly, the notch antenna configuration of the present invention provides improved performance over portable radio antennas which are polarized along the long axis of the radio housing.

Since fully duplex portable radiotelephones, like any telephone handset, are typically held in the nearly-horizontal position between the user's ear and mouth, a new antenna design is required to optimize the radiation performance. The present invention provides an improved antenna configuration for a fully duplex portable radiotelephone which is normally operated in such a position. Furthermore, the present invention provides an internal antenna capable of operating in two separated frequency bands by providing a matched input for the transmitter at one frequency band and a separate matched input for the receiver at a different frequency band.

While specific embodiments of of the present invention have been shown and described herein, further modifications and improvements may be made by those skilled in the art. All such modifications which contain the basic underlying principles disclosed and claimed herein are within the scope of this invention.

What is claimed is:

1. A portable radio transceiver comprising:
   receiver circuitry which receives signals in a first frequency range;
   transmitter circuitry which transmits signals in a second frequency range;
   an elongated housing comprised of conductive material and containing said transmitter circuitry and said receiver circuitry therein, said housing having top and bottom portions located at opposite ends of the major longitudinal axis of said housing; and
   antenna means for radiating vertically polarized E-field waves in a substantially omnidirectional radiation pattern when said transceiver is positioned in free space such that said longitudinal axis is approximately 30 degrees to the horizontal, said antenna means comprising an aperture constructed in said bottom portion of said conductive housing and centered along the major longitudinal axis of said housing.

2. The portable radio transceiver according to claim 1, wherein said antenna means is an open-ended notch antenna.

3. The portable radio transceiver according to claim 2, wherein said elongated housing is of substantially rectangular shape having a length L, width W less than L, and depth D less than W.

4. The portable radio transceiver according to claim 3, wherein said notch antenna is positioned such that a plane passing through the notch is perpendicular to the major surface plane of said housing.

5. The portable radio transceiver according to claim 2, wherein said notch antenna has an effective electrical length intermediate the first and second frequency ranges greater than 1/10th of a wavelength and less than ⅜th of a wavelength.

6. A portable radio transceiver comprising:
   receiver circuitry which receives signals in a first frequency range;
   transmitter circuitry which transmits signals in a second frequency range;
   an elongated housing of substantially rectangular shape having a length L, width W less than L, and depth D less than W, said housing being comprised of conductive material and containing said transmitter circuitry and said receiver circuitry therein, said housing having top and bottom portions located at opposite ends of the major longitudinal axis of said housing; and
   notch antenna means for radiating radio frequency waves, said notch antenna means constructed in said bottom portion of said housing and centered along said major longitudinal axis of said housing and positioned such that a plane passing through the notch is perpendicular to the major surface plane of said housing,
   whereby said notch antenna means radiates vertically polarized E-field waves in a substantially omnidirectional radiation pattern when said transceiver is positioned in free space such that said longitudinal axis is approximately 30 degrees to the horizontal.

7. The portable radio transceiver according to claim 6, wherein said notch antenna means has an effective electrical length intermediate the first and second frequency ranges greater than 1/10th of a wavelength and less than ⅜th of a wavelength.

8. The portable radio transceiver according to claim 7, wherein said notch antenna means has an effective electrical length of approximately ¼th of a wavelength.

9. The portable radio transceiver according to claim 6, wherein said transceiver is a fully-duplex radiotelephone.

10. The portable radio transceiver according to claim 6, wherein the E-field polarization remains vertical when said transceiver is oriented to a position rotated 180 degrees about its major longitudinal axis.

11. The portable radio transceiver according to claim 6, further including a first and second transmission line means for coupling said notch antenna means to said receiver and transmitter circuitry and for independently tuning the transmitter frequency response from the receiver frequency response by adjusting the lengths of said first and second transmission line means.

12. A portable radio transceiver comprising:
   receiver circuitry which receives signals in a first frequency range, s id receiver circuitry including a first filter having a predetermined impedance in said first frequency range and a substantial reactance in a second frequency range;
   transmitter circuitry which transmits signals in said second frequency range, said transmitter circuitry including a second filter having a predetermined impedance in said second frequency range and a substantial reactance in said first frequency range;
   an elongated housing comprised of conductive material and containing said transmitter circuitry and said receiver circuitry therein, said housing having top and bottom portions located at opposite ends of the major longitudinal axis of said housing;
   notch antenna means for radiating and receiving radio frequency waves, said notch antenna means comprising an open-ended notch aperture constructed in said bottom portion of said conductive housing and centered along said major longitudinal axis of said housing, said notch antenna means having first and second antenna terminals corresponding to said first and second frequency ranges, respectively;
   first transmission line means for coupling said notch antenna first antenna terminal to said first filter, the end of said first transmission line means which is connected to said first filter comprising a first filter port;
   second transmission line means for coupling said notch antenna second antenna terminal to said second filter, the end of said second transmission line means which is connected to said second filter comprising a second filter port, said first and second transmission line means having characteristic impedances equal to said predetermined impedances of said first and second filters, respectively, said first transmission line means having a length such that the impedance at said notch antenna second antenna terminal in said second frequency range is substantially equal to the characteristic impedance of said second transmission line means; and said second transmission line means having a length such that the impedance at said notch antenna first antenna terminal in said first frequency range is substantially equal to the characteristic impedance of said first transmission line means, whereby said first and second filter ports provide impedance matches at said first and second frequency ranges, respectively.

13. The portable radio transceiver according to claim 12, wherein said elongated housing is of substantially rectangular shape having a length L, width W less than L, and depth D less than W.

14. The portable radio transceiver according to claim 13, wherein said notch antenna means is positioned such that a plane passing through the notch is perpendicular to the major surface plane of said housing.

15. The portable radio transceiver according to claim 12, wherein said notch antenna means has an effective electrical length of approximately ¼th of a wavelength.

16. The portable radio transceiver according to claim 12, wherein said transceiver is a fully-duplex radiotelephone.

17. The portable radio transceiver according to claim 12, wherein said notch antenna means radiates vertically polarized E-field waves in a substantially omnidirectional radiation pattern when said transceiver is positioned in free space such that said longitudinal axis is approximately 30 degrees to the horizontal.

18. The portable radio transceiver according to claim 17, wherein the E-field polarization remains vertical when said transceiver is oriented in a position rotated 180 degrees about its major longitudinal axis.

19. The portable radio transceiver according to claim 12, wherein said first and second transmission line means each has the same characteristic impedance.

20. The portable radio transceiver according to claim 12, wherein the impedance match between said first transmission line means and said first filter over said first frequency range and the impedance match between said second transmission line means and said second filter over said second frequency range each provide a standing wave ratio not greater than 2:1.

21. The portable radio transceiver according to claim 12, wherein said first transmission line means over said first frequency range and said second transmission line means over said second frequency range each has a length of less than ½ wavelength.

22. The portable radio transceiver according to claim 12, wherein said first and second transmission line means are coaxial cables each having a characteristic impedance of approximately 50 ohms.

* * * * *